(12) United States Patent
McPherson

(10) Patent No.: US 7,990,929 B2
(45) Date of Patent: Aug. 2, 2011

(54) WIRELESS COMMUNICATIONS DEVICE INCLUDING RAKE FINGER STAGE PROVIDING FREQUENCY CORRECTION AND RELATED METHODS

(75) Inventor: Rodney Keith McPherson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 909 days.

(21) Appl. No.: 11/945,615

(22) Filed: Nov. 27, 2007

(65) Prior Publication Data

US 2009/0135800 A1    May 28, 2009

(51) Int. Cl.
 *H04B 7/216* (2006.01)
(52) U.S. Cl. ......... 370/335; 370/342; 375/148; 375/340
(58) Field of Classification Search .................. None
 See application file for complete search history.

(56) References Cited

U.S. PATENT DOCUMENTS

| | | | | |
|---|---|---|---|---|
| 5,619,524 A * | 4/1997 | Ling et al. | ...... | 375/130 |
| 5,659,573 A * | 8/1997 | Bruckert et al. | ...... | 375/142 |
| 6,580,746 B2 | 6/2003 | Challa et al. | ...... | 375/130 |
| 6,810,072 B1 | 10/2004 | Akopian | ...... | 375/143 |
| 6,831,940 B2 | 12/2004 | Harms et al. | ...... | 375/130 |
| 7,020,180 B2 | 3/2006 | Challa et al. | ...... | 375/147 |
| 7,027,815 B2 | 4/2006 | Sendonaris | ...... | 455/441 |
| 7,058,378 B2 | 6/2006 | Grieco et al. | ...... | 455/255 |
| 7,088,955 B2 | 8/2006 | Challa et al. | ...... | 455/63.3 |
| 7,110,443 B2 | 9/2006 | Ozluturk | ...... | 375/152 |
| 7,133,647 B2 | 11/2006 | Dent | ...... | 455/75 |
| 7,173,958 B2 | 2/2007 | Ho et al. | ...... | 375/145 |
| 7,187,707 B2 | 3/2007 | Ho et al. | ...... | 375/145 |
| 2007/0071072 A1 * | 3/2007 | Banister et al. | ...... | 375/148 |
| 2008/0025386 A1 * | 1/2008 | Desset et al. | ...... | 375/239 |

FOREIGN PATENT DOCUMENTS

| | | |
|---|---|---|
| EP | 0849887 | 6/1998 |
| WO | 03/009557 | 1/2003 |

OTHER PUBLICATIONS

Wang et al., *Cell Search in W-CDMA*, IEEE Journal on Selected Areas in Communications, vol. 18, No. 8, Aug. 2000.

* cited by examiner

*Primary Examiner* — Chi H. Pham
*Assistant Examiner* — Shick Hom
(74) *Attorney, Agent, or Firm* — Allen, Dyer, Doppelt, Milbrath & Gilchrist, P.A.

(57) ABSTRACT

A wireless communications device may include a path searcher for detecting signal peak locations in a received spread-spectrum signal, and a RAKE finger stage. The RAKE finger stage may include a plurality of RAKE fingers for determining symbol values from the received spread-spectrum signal based upon the detected peak locations. Each RAKE finger may include at least one de-spreader for de-spreading time-staggered versions of the received spread-spectrum signal and operating at a signal rate of the received spread-spectrum signal, and a frequency corrector downstream from the at least one de-spreader comprising a phase lock loop (PLL) operating at a rate that is less than the signal rate.

23 Claims, 15 Drawing Sheets

WIRELESS COMMUNICATIONS DEVICE INCLUDING RAKE FINGER STAGE PROVIDING FREQUENCY CORRECTION AND RELATED METHODS

GOVERNMENT LICENSE RIGHTS

The U.S. Government has a paid-up license in this invention and the right in limited circumstances to require the patent owner to license others on reasonable terms as provided for by the terms of a proprietary U.S. Government contract.

FIELD OF THE INVENTION

The present invention relates to the field of communications systems, and, more particularly, to wireless communications systems and related methods.

BACKGROUND OF THE INVENTION

Various communications protocols are used for cellular and other wireless communications. One such protocol is Code Division Multiple Access (CDMA), which employs spread-spectrum technology and uses unique codes assigned to different signal streams to allow the signals to share a common frequency band. A third generation (3G) variant of CDMA is Wideband Code Division Multiple Access (W-CDMA), which is a wideband spread-spectrum mobile air interface that utilizes the direct sequence CDMA signaling method and achieves higher speeds and support more users, as compared to typical Time Division Multiplexing (TDMA) used by second generation (2G) Global System for Mobile Communications (GSM) networks, for example.

Some wireless environments may also be subject to high Doppler frequency offset or spreading, as well as multi-path fading. Thus, to achieve desired signal acquisition may require relatively sophisticated frequency tracking circuitry. One particular receiver that is commonly used to mitigate the effects of multi-path fading is the so-called RAKE receiver. A RAKE receiver uses several sub-receivers each delayed slightly to tune in to the individual multi-path components. Each component is descrambled and de-spread independently, but combined at a later stage.

One exemplary approach to acquire and track pilots in a CDMA system which utilizes a RAKE receiver arrangement is set forth in U.S. Pat. No. 7,088,955 to Challa et al. Frequency acquisition of a number of signal instances (i.e., multi-paths) in a received signal is achieved concurrently based on a frequency control loop maintained for each finger processor of a RAKE receiver. Upon successful acquisition, frequency tracking of acquired multi-paths is achieved based on a combination of a frequency control loop maintained for an oscillator used for downconverting the received signal and the RAFCs for the finger processors. In a tracking mode, the VAFC tracks the average frequency of the acquired multi-paths by adjusting the frequency of the oscillator. The RAFC of each finger processor tracks the residual frequency error (e.g., due to Doppler frequency shift) of the individual acquired multi-path by adjusting the frequency of a complex sinusoidal signal used in a rotator within the finger processor.

Despite the potential advantages of such systems, further advancements may be useful to help reduce the complexity of receiver architectures, yet while still providing desired pilot signal acquisition, in relatively harsh multi-path environments, even when characterized by a high Doppler frequency or frequency offset.

SUMMARY OF THE INVENTION

In view of the foregoing background, it is therefore an object of the present invention to provide a wireless communications device and related methods for providing received signal frequency tracking at a reduced complexity.

This and other objects, features, and advantages are provided by a wireless communications device which may include a path searcher for detecting signal peak locations in a received spread-spectrum signal, and a RAKE finger stage. The RAKE finger stage may include a plurality of RAKE fingers for determining symbol values from the received spread-spectrum signal based upon the detected signal peak locations. More particularly, each RAKE finger may include at least one de-spreader for de-spreading time-staggered versions of the received spread-spectrum signal and operating at a signal rate of the received spread-spectrum signal, and a frequency corrector downstream from the at least one de-spreader comprising a phase lock loop (PLL) operating at a rate that is less than the signal rate.

Advantageously, the at least one de-spreader may be implemented using discrete circuitry, and the frequency correction stage may be implemented using a microprocessor. In addition, the at least one de-spreader may include a control de-spreader for the time-staggered signal versions, and a data de-spreader for on-time signal versions. Furthermore, each RAKE finger may include a control output path for outputting control channel symbols, and a data output path for outputting data channel symbols. Moreover, the data output path may include a phase adjust module coupled to the control output path for compensating symbol rate phase differences between control and data symbols.

Each RAKE finger may further include a buffer upstream from the at-least one de-spreader for buffering the time-staggered versions of the received spread-spectrum signal. By way of example, the received spread-spectrum signal may be a Code Division Multiple Access (CDMA) signal. A finger controller may also be included for controlling the RAKE finger stage based upon the detected signal peak locations. The wireless communications device may also include an output stage downstream from the RAKE finger stage for outputting combined symbols based upon the detected symbol values.

A wireless communications method aspect may include detecting signal peak locations in a received spread-spectrum signal, and determining symbol values from the received spread-spectrum signal based upon the detected signal peak locations using a plurality of RAKE fingers. More particularly, the symbol values may be detected by de-spreading time-staggered versions of the received spread-spectrum signal at a signal rate of the received spread-spectrum signal, and performing frequency correction after de-spreading using a phase lock loop (PLL) operating at a rate that is less than the signal rate.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
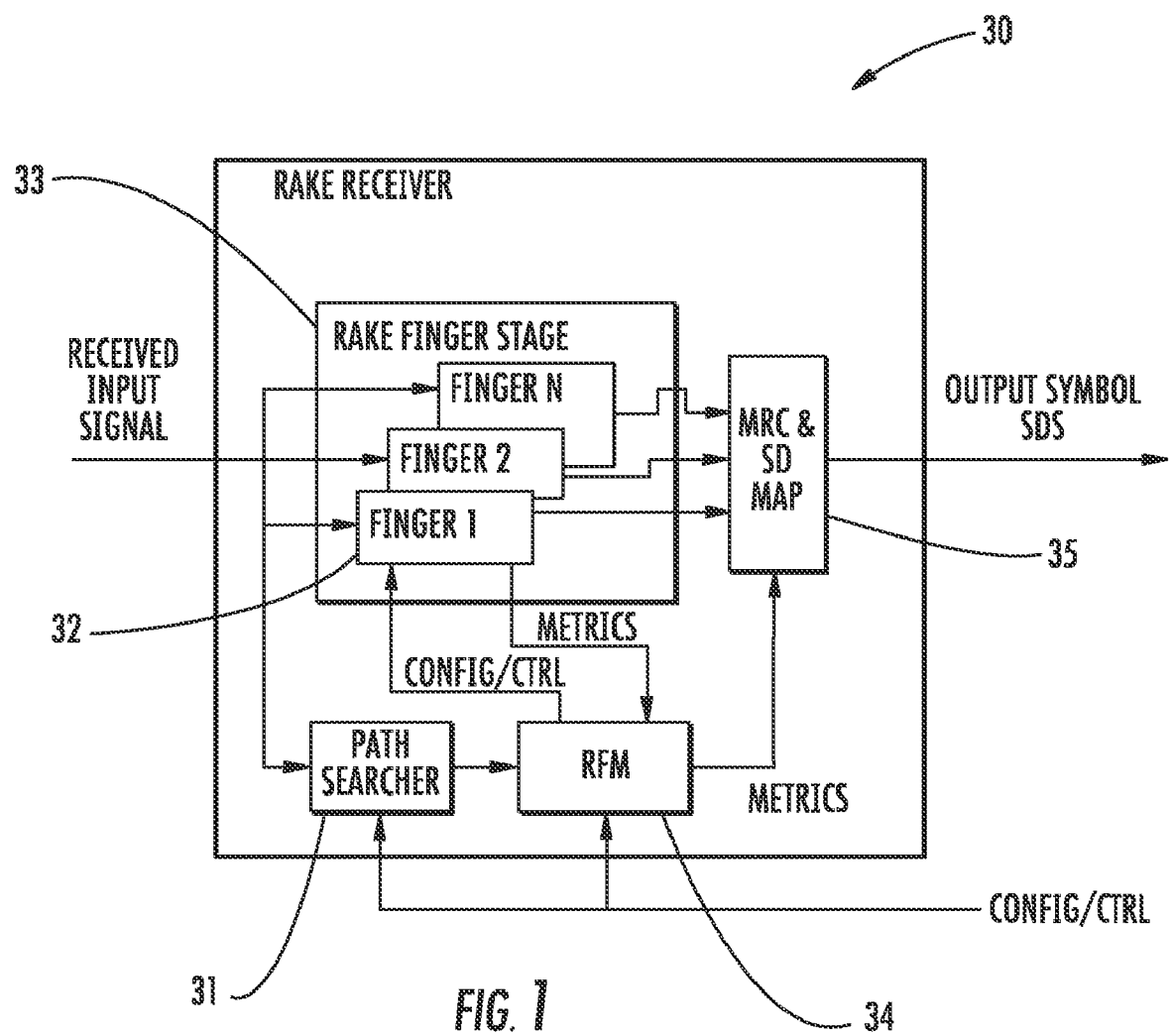
FIG. 1 is a schematic block diagram of wireless communications device in accordance with the present invention.
Figure 10:
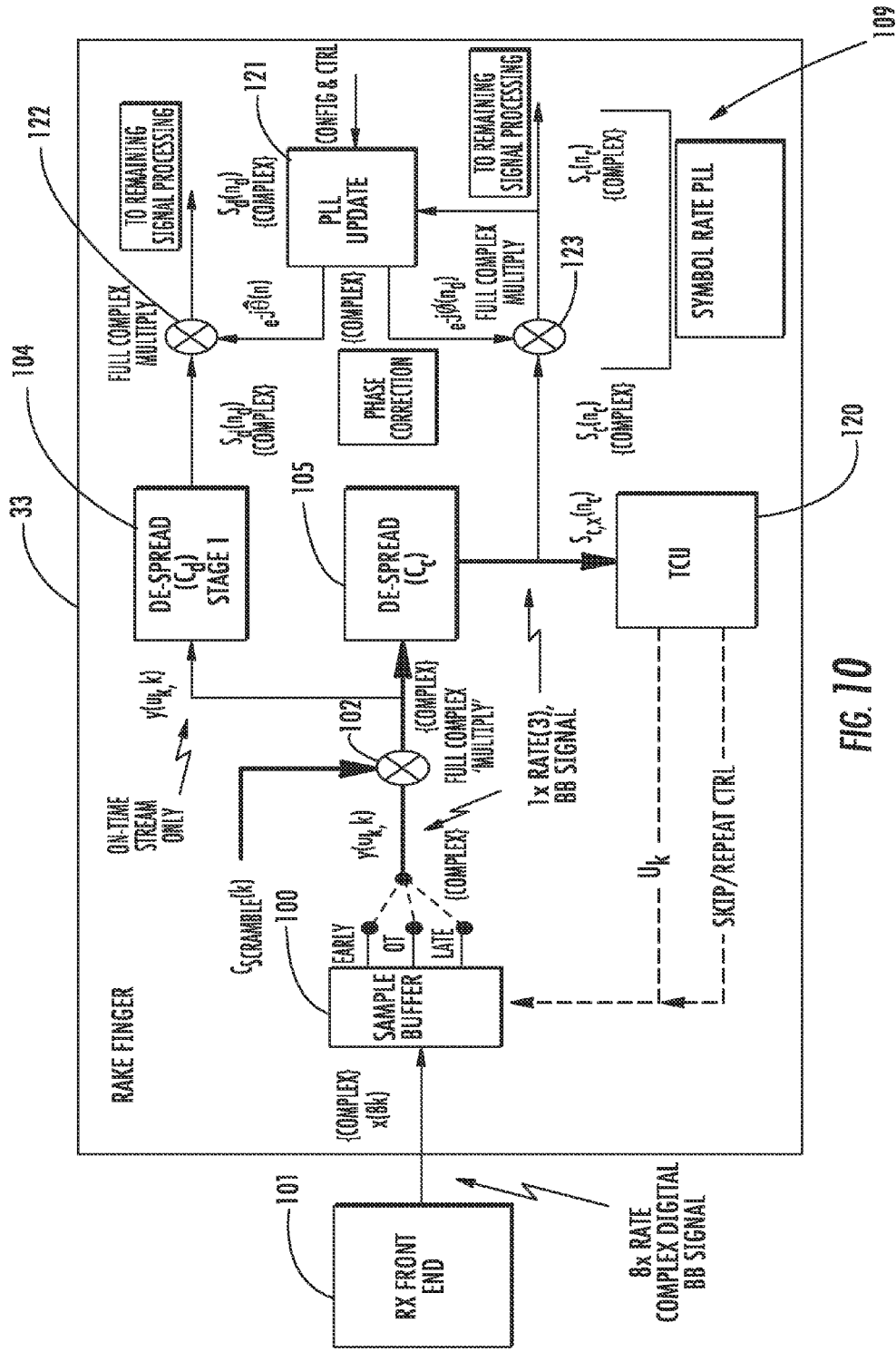
FIG. 10 is a block diagram of an exemplary RAKE finger of the RAKE finger stage illustrated in FIG. 1.
Figure 11:
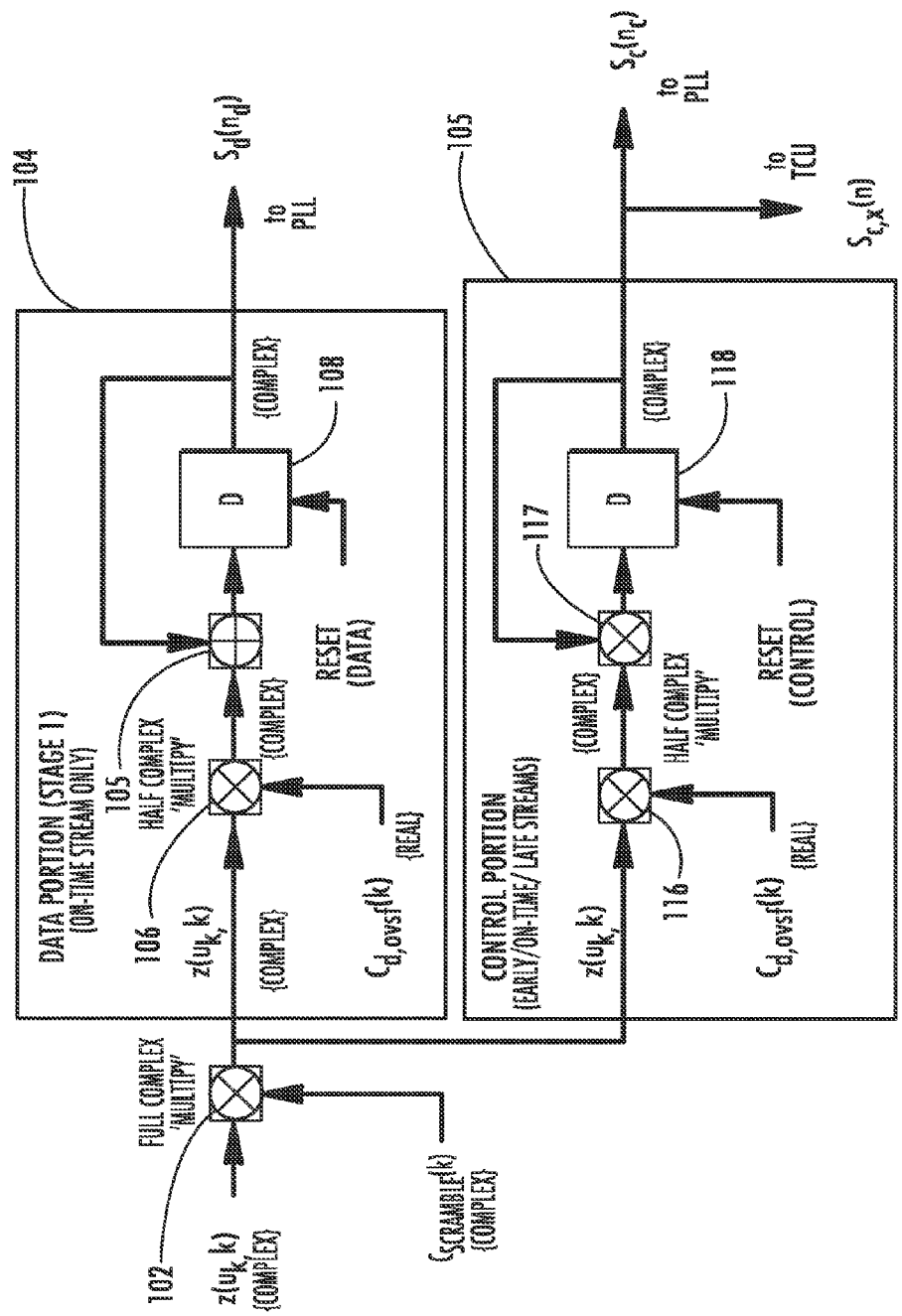
FIG. 11 is a block diagram of the de-spreaders of FIG. 10 in greater detail.

Referring initially to FIG. 1, a wireless communications device including a RAKE receiver 30 is first described. The RAKE receiver 30 is particularly well suited for CDMA applications, and more particularly, W-CDMA applications where relatively high degrees of multi-path fading may be encountered. Generally speaking, the RAKE receiver 30 illustratively includes a path searcher 31 for detecting signal peak locations in a received input signal. More particularly, the input signal is received by one or more antennas and radio frequency (RF) front-end circuitry 101 (FIG. 10) upstream from the RAKE receiver 30, as will be appreciated by those skilled in the art. A RAKE finger stage 32 illustratively includes a plurality of RAKE fingers 33 for determining symbol values by descrambling and/or despreading the symbol values from the received spread-spectrum signal based upon the detected signal peak locations. Furthermore, a finger controller or RAKE finger manager (RFM) 34 controls the RAKE fingers 33 based upon the signal peak values and/or locations detected by the path searcher 31. An output stage 35 is downstream from the RAKE finger stage 32 and outputs symbols based upon the descrambled symbol values from the RAKE fingers 33, as will also be appreciated by those skilled in the art. In the illustrated embodiments the output stage 35 performs maximum ratio combining/soft decision mapping, for example.

CDMA systems typically provide peak performance when the receiver utilizes a RAKE configuration, The RAKE receiver gathers energy from different multi-path arrivals. However, to utilize a RAKE receiver, accurate detection and estimation of the multi-path components is desired. Moreover, CDMA systems may need to operate across a large range of velocities and frequency offsets. The Doppler offset due to velocity may have a significant performance impact on path searchers, and the frequency offset due to Doppler or other sources creates coherence loss.

Thus, there is a desire to balance noise performance against coherence loss to determine the best length of correlation to be performed. More particularly, longer correlation is used to address noise (i.e., reduce the noise floor at the output of the correlator), but correlation that is too long may result in unacceptable coherence loss if there is appreciable frequency offset. The following tables provide simulated correlation peak coherence loss as a function of coherent calculation iterations (measured in 256 chip increments) and frequency offset for 3GPP applications (e.g., in the 500 Hz offset range) (Table 1), and for high-velocity applications (e.g., in the 1600 Hz frequency offset range) (Table 2).

TABLE 1

| 3GPP (Frequency Offset ~500 Hz) | |
|---|---|
| Coherent Correlation Length | Coherence Loss (dB) |
| 1x | 0.016 |
| 2x | 0.064 |
| 3x | 0.143 |
| 4x | 0.256 |
| 5x | 0.401 |
| 6x | 0.579 |

TABLE 2

| High Frequency Offsets Scenarios (Frequency Offset ~1600 Hz) | |
|---|---|
| Coherent Correlation Length | Coherence Loss (dB) |
| 1x | 0.163 |
| 2x | 0.660 |
| 3x | 1.516 |
| 4x | 2.777 |
| 5x | 4.531 |
| 6x | 6.935 |

Generally speaking, a high coherence loss will translate to an unacceptable searcher performance loss. However, Applicants have observed that some moderate level of coherence loss may be acceptable. For example, in 3GPP scenarios, a 3*256 chip coherent filtering operation may be acceptable, but in a high-Doppler or high frequency offset scenario only a 1*256 chip coherent filtering may be acceptable.

In typical prior art configurations, the path searcher uses frequency binning to advantageously locate peak levels. Generally speaking, the path searcher shifts the frequency of a received signal to create multiple copies with different frequency offsets. Bin widths are selected to reduce the maximum offset within a single bin, and the number of bins is selected to cover a maximum range of offsets expected by the system. Moreover, correlators (i.e., searchers) are used to search each frequency bin independently. A downside of this approach is that each bin requires an independent correlator (searcher) and all of the complexity associated therewith. Thus, in a typical arrangement, the incoming signal is shifted to create multiple copies that are offset in frequency. Each copy is then processed separately, which allows the receiver to maintain long correlators and reduce coherence loss. Yet, the complexity scales linearly with the number of frequency hypotheses.

Figure 2:
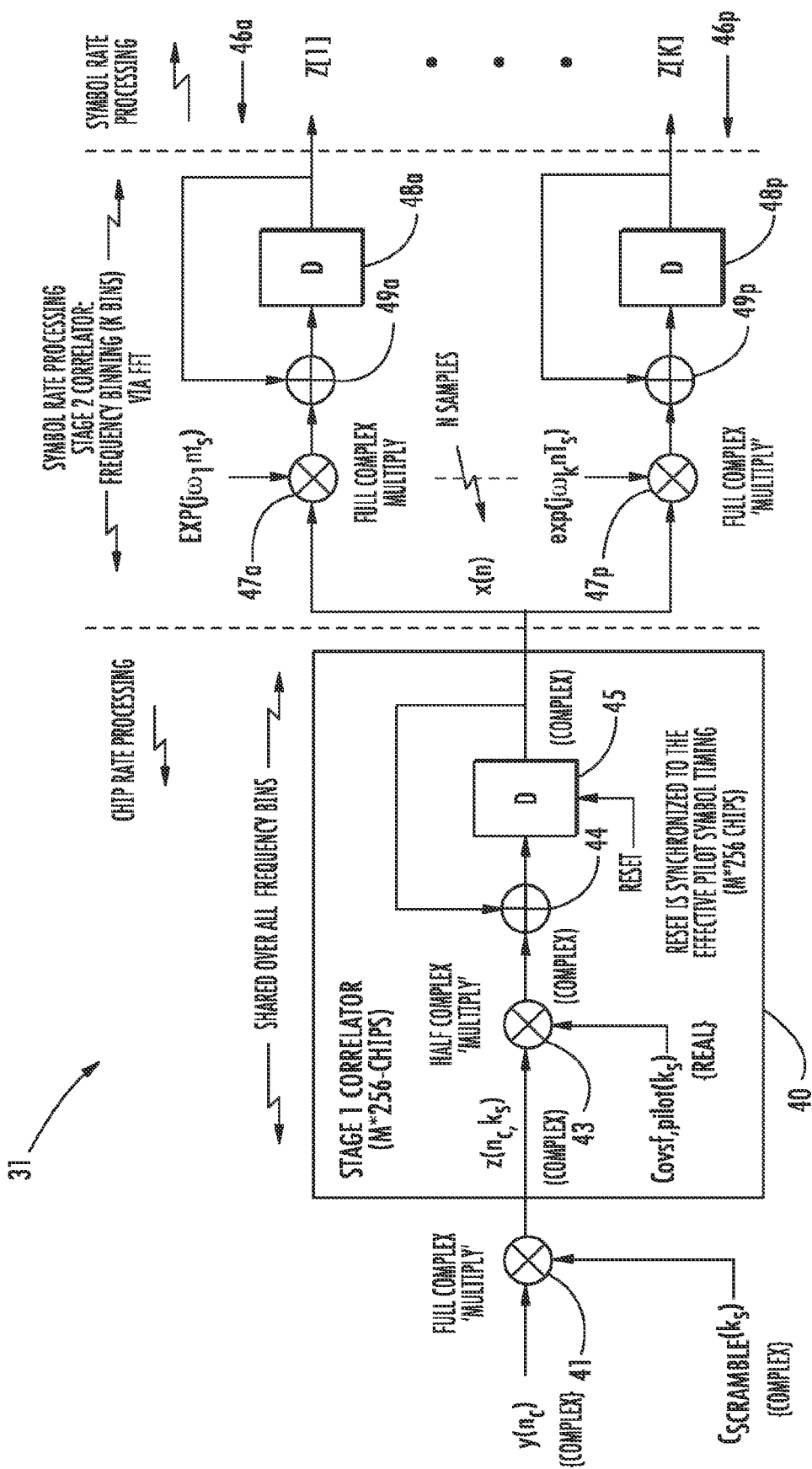
FIG. 2 is a schematic block diagram of the path searcher of FIG. 1 in greater detail.

Turning now to FIG. 2, in accordance with one advantageous W-CDMA UMTS embodiment, the path searcher 31 illustratively includes a common coherent correlator 40 ("Stage 1 Correlator" in FIG. 2) for performing a common coherent correlation operation on the received signal. In the exemplary embodiment, the common coherent correlator 40 is downstream from a mathematical operating block, which may conceptually be considered as a multiplier 41, which has as its inputs the received signal y($n_c$) and scrambling coefficients $C_{scramble}(k_s)$ and performs a full complex multiply operation, as will be appreciated by those skilled in the art. However, it will be appreciated that in some embodiments the mathematical operation being performed may simply be a sign change operation (as discussed further below), and thus a full multiplier need not necessarily be implemented in all cases. The common coherent correlator 40 illustratively includes another multiplier 43 receiving as its inputs the complex output $z(n_c,k_s)$ of the multiplier 41 and a pilot coefficient $C_{ovsf,pilot}(k_s)$. In particular, the embodiment illustrated in FIG. 2 may advantageously be used for uplink communications on a dedicated physical channel (DPCH), which provides the basis for the Orthogonal Variable Spreading Factor (OVSF) pilot coefficient $C_{ovsf,pilot}(k_s)$, as will be appreciated by those skilled in the art. It should be noted that in the exemplary implementation for Dedicated Physical Control Channel (DPCCH), $C_{ovsf}(k_s)$ is "+1" for all k, and $C_{osvf,pilot}(k_s) = C_{pilot}(k_s)C_{ovsf}(n_c)$. The complex output of the multiplier 43 is provided to an accumulator synchronized to the symbol timing and comprising an adder 44 and a delay element 45. The adder 44 also receives as an input feedback from the delay element 45.

The common coherent correlator 40 is "common" in the sense that its output is used by a plurality, typically all, of the peak detection frequency bin correlators 46a-46p performing a second stage correlation of the path filter 40. The peak detection frequency bin correlators 46a-46p are arranged in parallel downstream from the common coherent correlator 40. Each frequency bin correlator 46 illustratively includes a respective frequency shifter 47 (i.e., multiplier) for receiving the complex output x(n) of the common coherent correlator 40 (i.e., from the delay element 45), and shifting the common correlator output by different frequencies, i.e., $\exp(j\omega_k nT_s)$, where $\omega_k$ is the frequency offset hypothesis, n is the de-spread symbol index, and Ts is the control symbol period (256 chips). Each frequency bin correlator 46 further illustratively includes a respective accumulator comprising an adder 49 receiving the output of its respective multiplier 47 and a delay element 48 downstream therefrom.

By way of contrast, typical prior art configurations simply have a plurality of frequency bin correlators connected in parallel, with no common or "up front" correlation performed on the received signal prior to the inputs of the respective frequency bin correlators. Yet, in the illustrated embodiment the complexity of the frequency binning is significantly reduced in multiple ways. First, the frequency shifters 47a-47p are positioned past (i.e., downstream from) the initial common coherent correlator 40 so that its output is shared by all of the bin correlators 46a-46p, which provides significant complexity savings. Moreover, the resulting structure of the bin correlators 46a-46p may advantageously be implemented using Fast Fourier Transform (FFT) operations, which further reduces the complexity of the path searcher 31.

Figure 5:
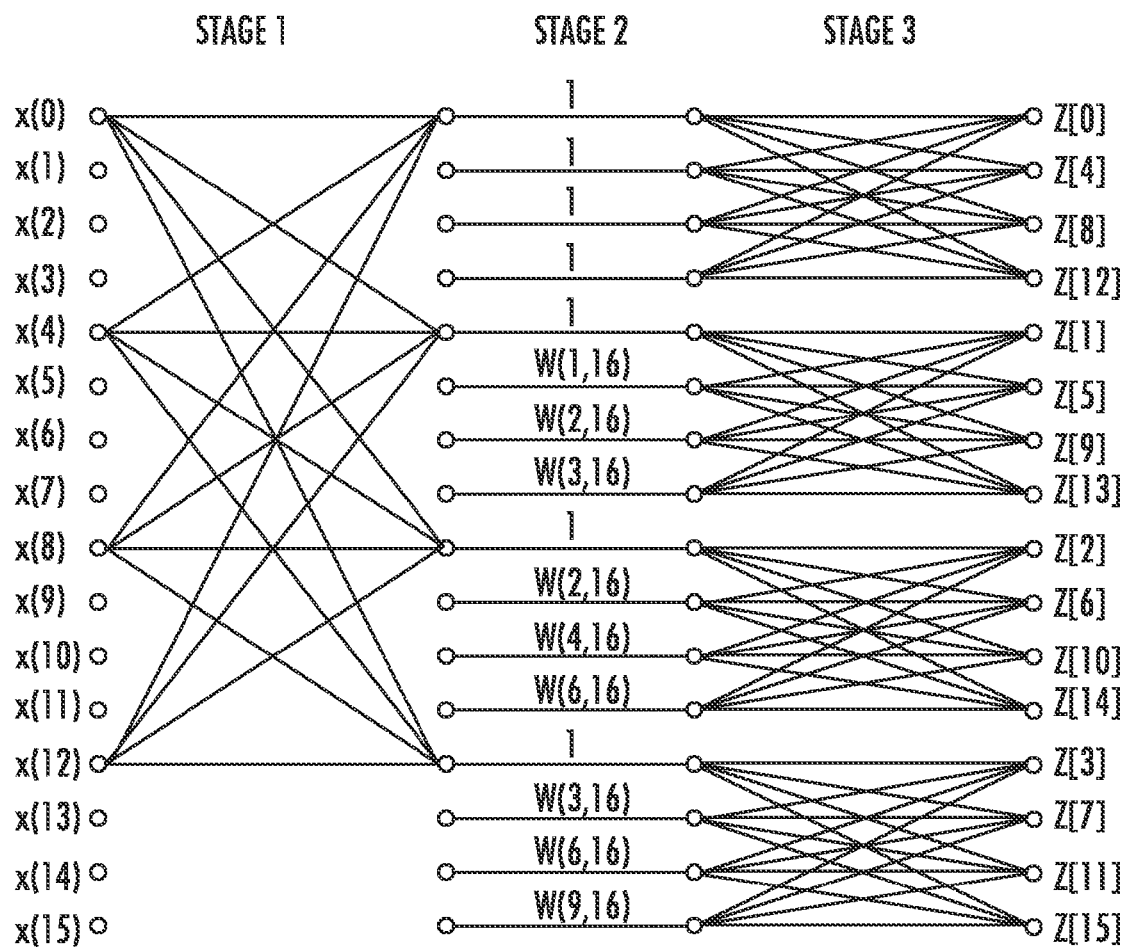
FIGS. 5 and 6 are radix-4 butterfly diagrams illustrating FFT decomposition operations of the path searcher of FIG. 2 in greater detail.
Figure 6:
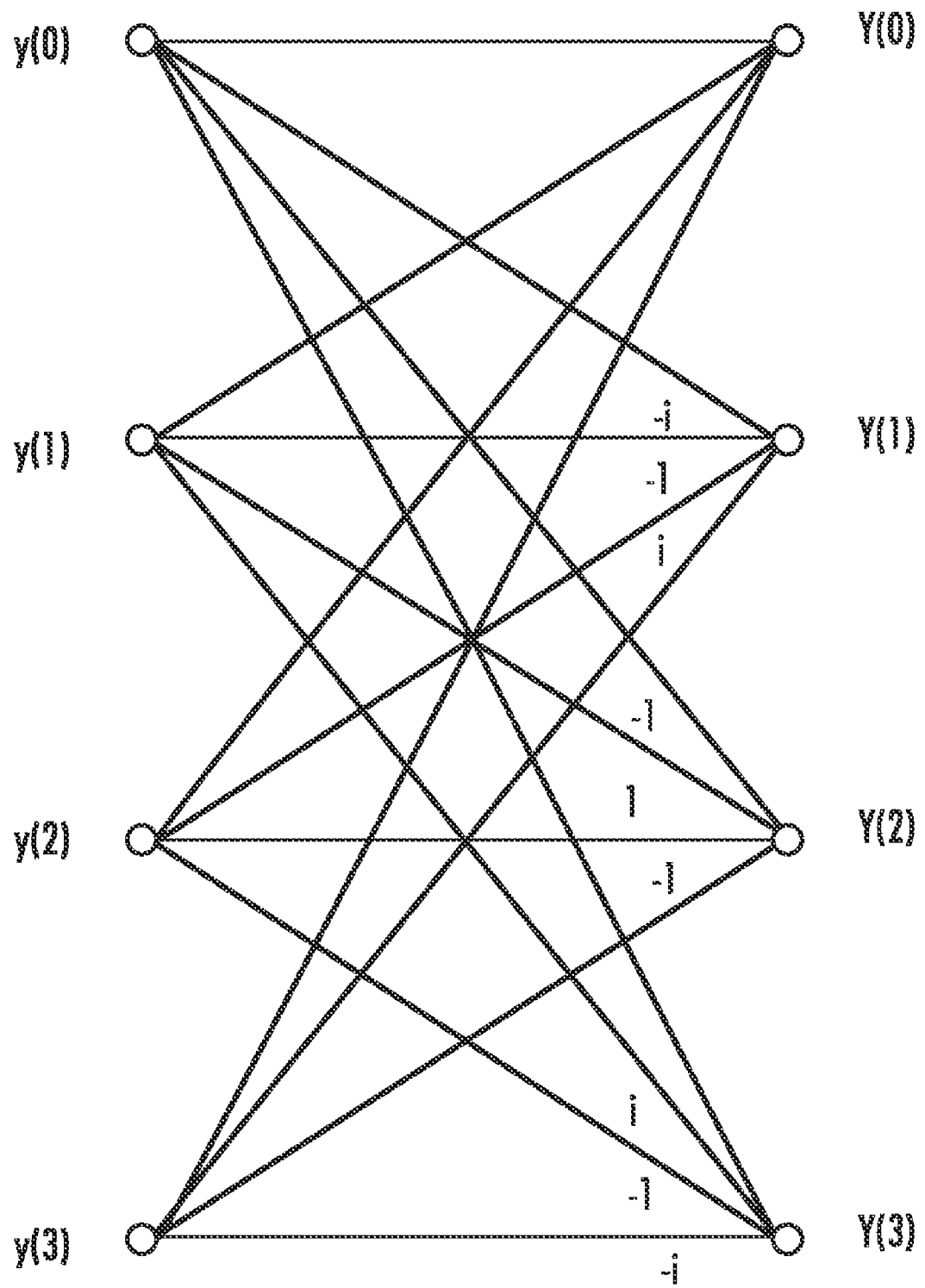

Referring now more particularly to FIGS. 5-6, the implementation of the bin correlators 46a-46p using FFT operations is now further described. Taking for example a 16-point FFT, which is used in the example shown in FIG. 2, a 16-point FFT can be decomposed into three stages (see FIG. 5), namely:

Stage 1→Four 4-point FFTs;
Stage 2→9 non-trivial factors (multiplications); and
Stage 3→Four 4-point FFTs, where $W(k,16) = e^{j \cdot 2 \cdot \pi \cdot k/16}$, $W(0,16)=1$.

As will be appreciated by those skilled in the art, 4-point FFT engines can be implemented very efficiently, such as by the radix 4 butterfly structure illustrated in FIGS. 5 and 6 (FIG. 6 shows the computation details and butterfly structure for a basic 4-point FFT). For the first and third stages, no multiplies are used, rather only I/Q swaps and sign inversions are used to realize the underlying complex multipliers as illustratively shown. It should be noted that for simplicity of illustration, not all of the "butterflies" are shown in stage 1, but instead only for every $5^{th}$ x(n) value (i.e., the $1^{st}$ butterfly). For further details on FFT implementation using radix 4 butterfly structures see Oppenheim and Schafer, "Discrete-Time Signal Processing", Prentice Hall, 1989, pgs. 616-618.

The mathematical derivation for implementation of the bin correlators 46a-46p using FET operations is as follows:

$$y^k(n) = x(n) \cdot e^{-j\omega_k nT_s}$$

$$Z[k] = \sum_{n=0}^{5} y^k(n)$$

$$= \sum_{n=0}^{5} x(n) \cdot e^{-j\omega_k nT_s}$$

$$= \sum_{n=0}^{5} x(n) \cdot e^{-j2\pi \cdot f_k \cdot nT_s}$$

Let $f_k = \dfrac{k}{N} \cdot f_s$, so $f_k T_s = k/N$. Let $N = 16$, and x(n) = 0 for n > 5 (i.e., zero padding per slot)

$$Z[k] = \sum_{n=0}^{5} x(n) \cdot e^{-j2\pi \cdot n \cdot k/N} + \sum_{n=6}^{15} 0 \cdot e^{-j2\pi \cdot n \cdot k/N}$$

$$= \sum_{n=0}^{N-1} x(n) \cdot e^{-j2\pi \cdot n \cdot k/N}$$

This results in a correlation output of:

$$Z[k] = \sum_{n=0}^{N-1} x(n) \cdot e^{-j2\pi \cdot n \cdot k/N}, \quad 0 \leq k < N$$

Recalling the definition of an FET for comparison:

$$X[k] = \sum_{n=0}^{N-1} x(n) \cdot e^{-j2\pi \cdot n \cdot k/N}, \quad 0 \leq k < N$$

It will therefore be appreciated that given suitable choices for N and $f_k$, the resulting Z[k] is relatively easily recognized as a DFT. Thus, the FFT may be used for an efficient computation of Z[k]

Figure 3:
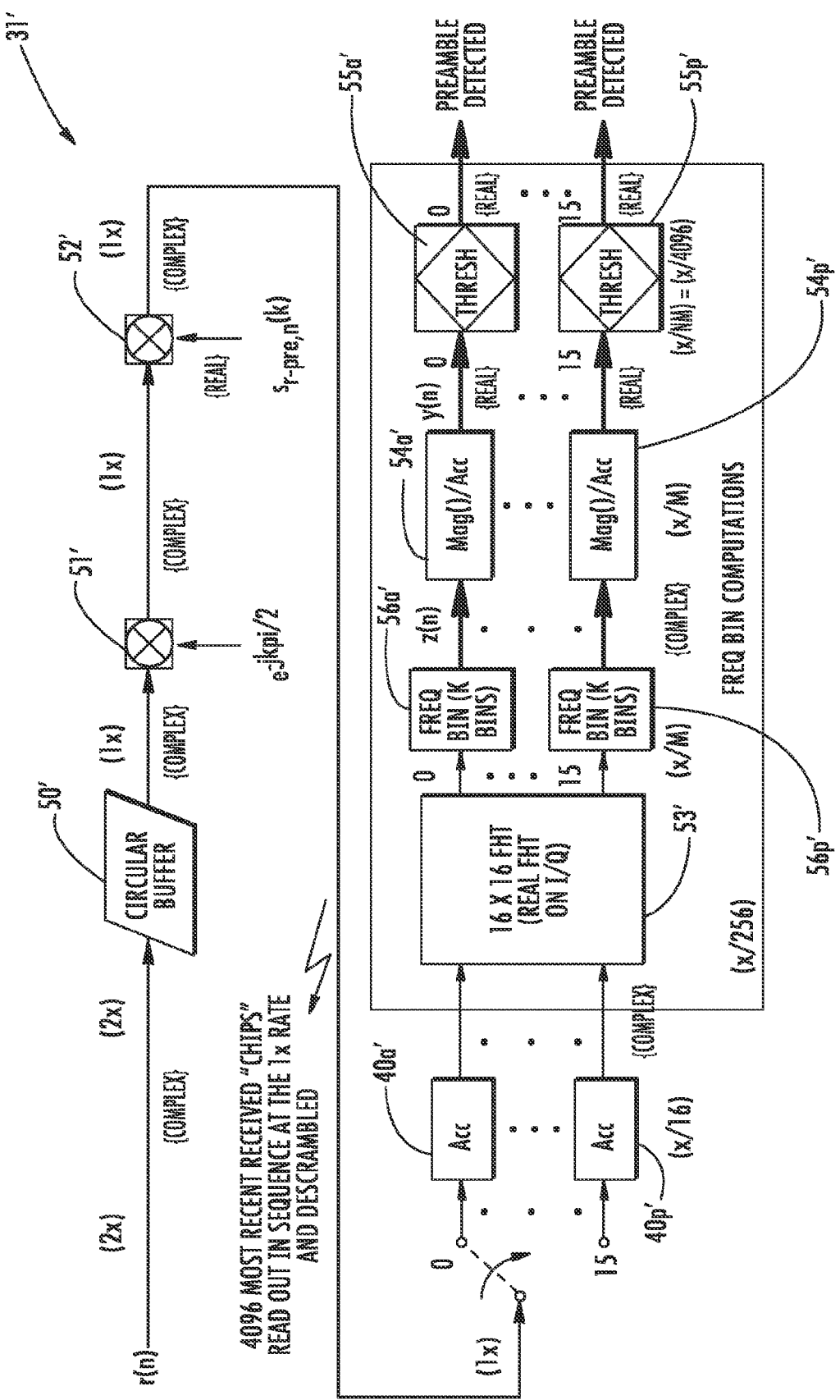
FIG. 3 is a schematic block diagram of an alternative embodiment of the path searcher of FIG. 2 incorporating PRACH preamble detection components.
Figure 4:
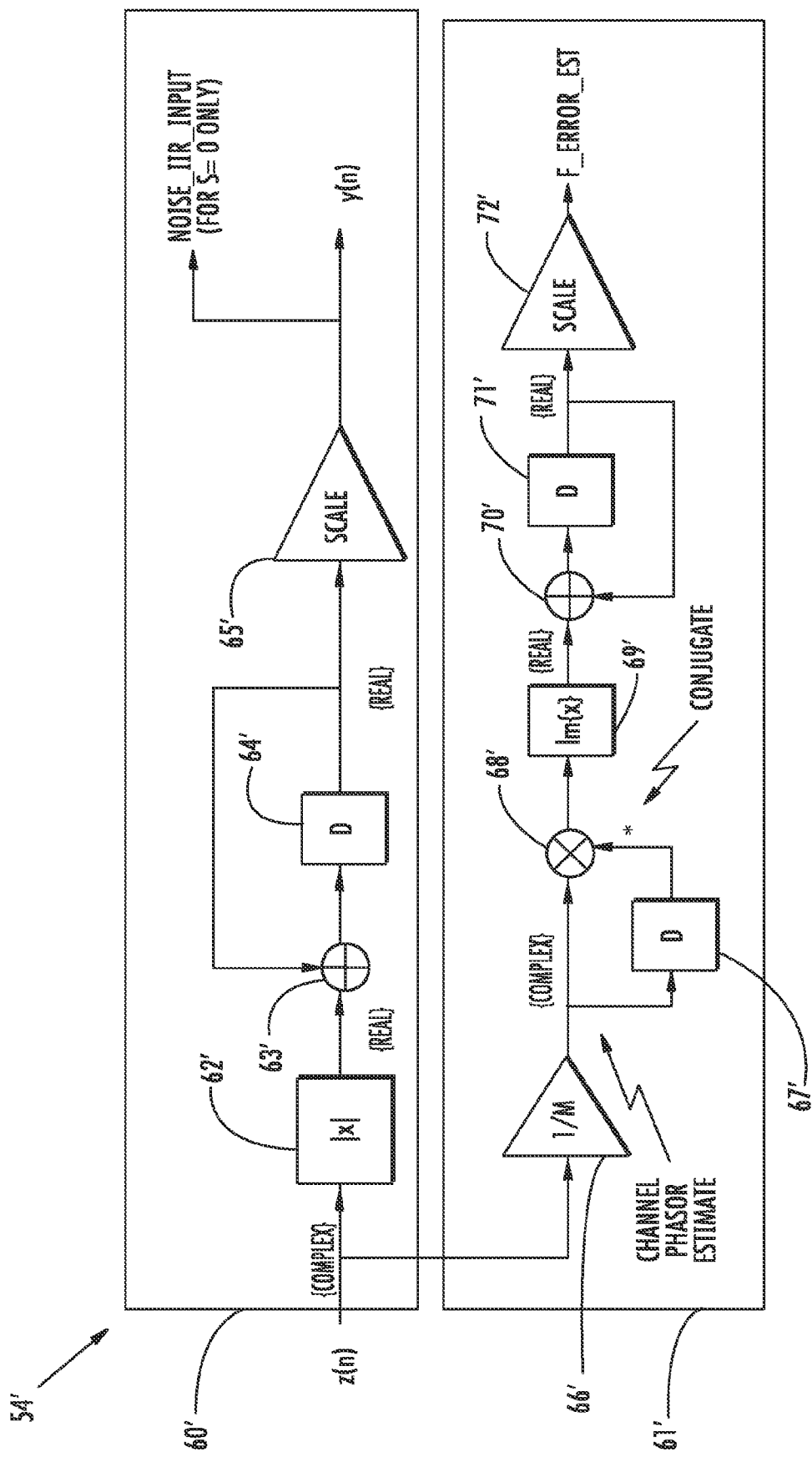
FIG. 4 is a schematic block diagram of the magnitude/accumulation block of FIG. 3 in greater detail.

Turning now to FIGS. 3 and 4, a similar configuration to that described above may be used for a path searcher 31' that accommodates preamble detection, such as PRACH preamble detection in a UMTS implementation, for example. The path searcher 31' illustratively includes a reception buffer 501 (e.g., a circular reception buffer) receiving complex signal samples r(n) at a 2× oversampling rate (although other rates may also be used). In some embodiments, other buffer types/sizes or arrangements (e.g., streaming processing) may be used, as will be appreciated by those skilled in the art. The output of the reception buffer 50' is multiplied by a frequency component $e^{-jkpi/2}$ by a mathematical operating block (conceptually represented as a multiplier 51'), the complex output of which is input to a multiplier 52' which also receives as an input a real scalar $S_{r\text{-}pre,n}(k)$.

Once a communication session is established between two UMTS nodes, then the PRACH preamble is used, which requires a PRACH signature code to be detected from any of sixteen different possible signature codes. Advantageously, the above-described FFT-based frequency binning may also be implemented along with a PRACH Preamble detection algorithm. More particularly, the output of the multiplier 52' is switched between sixteen different correlation pathways, each of which includes a respective common coherent correlator 40a'-40p' (which are shown as accumulation blocks in FIG. 3 for clarity of illustration). The path searcher 31' also illustratively includes one or more fast Hadamard transform (FHT) modules 53' downstream from the common coherent correlators 40a'-40p' for performing PRACH signature code detection operations, as will be appreciated by those skilled in the art. In the illustrated embodiment, the FHT 53' is a 16×16 FHT, as shown. The frequency binning operations are performed on each signature correlation output from the FHT 53'.

Figure 7:
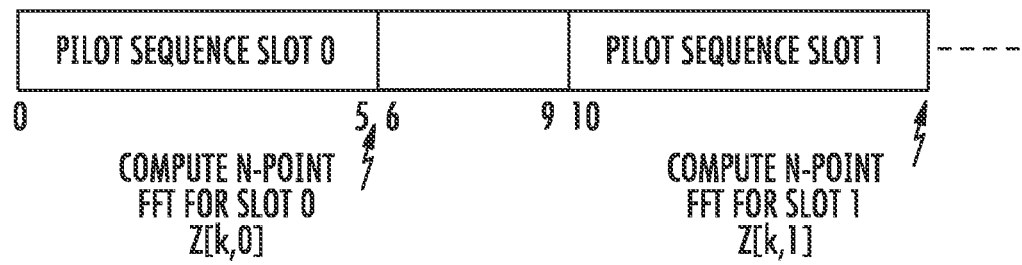
FIG. 7 is a pilot sequence diagram illustrating a signal pilot sequence slot format for the path searcher of FIG. 2.

Frequency bin stages 56a'-56p', each of which includes a respective set of bin correlators as shown in FIG. 2, are downstream from the FHT 53'. A magnitude and/or accumulator stage 54a'-54p' is positioned downstream of each frequency bin stage, which in turn is followed by a respective threshold detector 55a'-55p', which provide preamble detection outputs as shown. The magnitude operation is performed because of the complex number processing performed by the FFT operations, as will be appreciated by those skilled in the art. The accumulation operations may be used where a pilot sequence is spread across spaced-apart signal pilot sequence time slots, as seen in FIG. 7, for example, although this is not required in all embodiments. More particularly, the PRACH preamble is not constructed such that this will be the case, but this is the case for the DPCH. For the PRACH case, the accumulators (non-coherent) are used to split the preamble in two halves and compute an FFT per each half. This may be done to reduce the coherent correlation length and reduce coherence loss. In the DPCH case, the accumulators advantageously allow coherent accumulation of FFT results across signal pilot sequence slots as follows:

$$Z[k, 0] = \sum_{n=0}^{N-1} x(n) \cdot e^{-j2\pi nk/N}$$

$$\tilde{Z}[k, 1] = \sum_{n=10}^{N-1+10} x(n) \cdot e^{-j2\pi nk/N}$$

$$= \sum_{n=0}^{N-1} x(n+10) \cdot e^{-j2\pi(n+10)k/N}$$

$$\tilde{Z}[k, 1] = e^{-j2\pi 10k/N} \cdot \sum_{n=0}^{N-1} x(n+10) \cdot e^{-j2\pi nk/N}$$

$$= e^{-j2\pi 10k/N} \cdot Z[k, 1]$$

$$Z_D[k] = Z[k, 0] + \tilde{Z}[k, 1] + \ldots + \tilde{Z}[k, P-1]$$
$$= Z[k, 0] + e^{-j2\pi \cdot 1 \cdot 10k/N} \cdot$$
$$Z[k, 1] + \ldots + e^{-j2\pi \cdot (P-1) \cdot 10k/N} \cdot Z[k, P-1]$$

$$Z_D[k] = \sum_{p=0}^{P-1} e^{-j2\pi \cdot p \cdot 10 \cdot k/N} \cdot Z[k.p]$$

$$Z_D[k] = Z[k, 0] + \tilde{Z}[k, 1] + \ldots + \tilde{Z}[k, P-1]$$
$$= Z[k, 0] + e^{-j2\pi \cdot 1 \cdot 10k/N} \cdot$$
$$Z[k, 1] + \ldots + e^{-j2\pi \cdot (P-1) \cdot 10k/N} \cdot Z[k, P-1]$$

$$Z_D[k] = \sum_{p=0}^{P-1} e^{-j2\pi \cdot p \cdot 10 \cdot k/N} \cdot Z[k, p]$$

Where: $Z_D[k]$ represents the FFT results for slot p.

The length of the PRACH preamble is the same length (duration) as two DPCH pilot sequences with the 4 symbols inbetween as seen in FIG. 7, and this duration is 1 millisecond or 4096 chips. So, if one searcher is provisioned coherently (or non-coherently), the other searchers) will need to be similarly provisioned since the correlations are the same length. The accumulator including adder 63' and delay element 64' in FIG. 4 is used when the two halves of the 4096-chip PRACH preamble are combined non-coherently using the results of two FFT operations. In this case, the mirror operation for the DPCH searcher would be non-coherent combining of FFT results across slots, and the mathematical operations noted above would not be required, rather a much more simplified version may be used. If the PRACH searcher is provisioned for coherent operation over the entire PRACH preamble (~1 ms), a 1 FFT operation may be used and the above-noted accumulator need not be used in this case. The mirror operation in this case for the DPCH searcher is coherent combining across two slots, such that the equations presented above would be used as shown. Generally speaking, the choice of which correlation method to use will depend upon the particular embodiment and the acceptable level of coherence loss, hardware/processing constraints, etc., as will be appreciated by those skilled in the art. For example, longer coherent correlation lengths may require larger FFTs to manage the increase in coherence loss that would otherwise occur.

Referring now more specifically to FIG. 4, further details of an exemplary magnitude/accumulator stage 54' are now provided. The input signal is received by first and second branches 60', 61'. The first branch 60' illustratively includes an absolute value block 62' coupled to the input signal z(n), and an accumulator downstream therefrom. More particularly, an adder 63' is coupled to the output of the absolute value block 62'. A delay element 64' is coupled to the output of the adder 63', and the output of the delay element is fed back to an input of the adder and also provided to a scaler 65' to provide an output y(n) (note that this output may also provide a separate noise_iir_input for the case of s=0).

The second branch 61' is an optional frequency offset estimation branch that may advantageously be implemented where the FFT approach is not used and frequency estimation is performed by a more traditional approach, as will be appreciated by those skilled in the art. The second branch 61' illustratively includes an optional scaler 66' that divides by M followed by a multiplier 68'. The multiplier 68' has as its inputs the output of the scaler 66', and a conjugate of the inverter output which is generated by a delay element 67' coupled in parallel with the scaler output to the multiplier as shown. An imag{x} block 69' is downstream from the multiplier 68', followed by another accumulator (i.e., an adder 70' and delay element 71'). The block 69' takes the imaginary portion of the complex number and serves as a phase error detector. Other approaches may also be used, but the general goal is to approximate an arctangent function. Here again, the adder 70' combines the output of the imag{x} block 69' and the feedback output of the delay element 71'. The real output of the delay element 71' is provided as the input to a scaler 72', which provides an output F_error_est of the second branch.

In some embodiments the bin correlators 46a-46p provide a further refinement of the signal peak estimated by the FFT operations. More particularly, the FFT-based bin correlators 46a-46p will detect the bin in which the peak is located, but the exact position of the peak within the bin is not known (for simplicity, the center frequency of the bin is typically used as the frequency estimate). Yet, in embodiments where further refinement is desired, interpolation may be performed to more accurately estimate the position of the peak within the frequency range covered by the signal peak bin.

By way of example, using the following quadratic equations:

$$y = a + bx + cx^2$$

$$y' = b + 2cx = 0$$

$$x_{max} = -b/2 \cdot c$$

Figure 8:
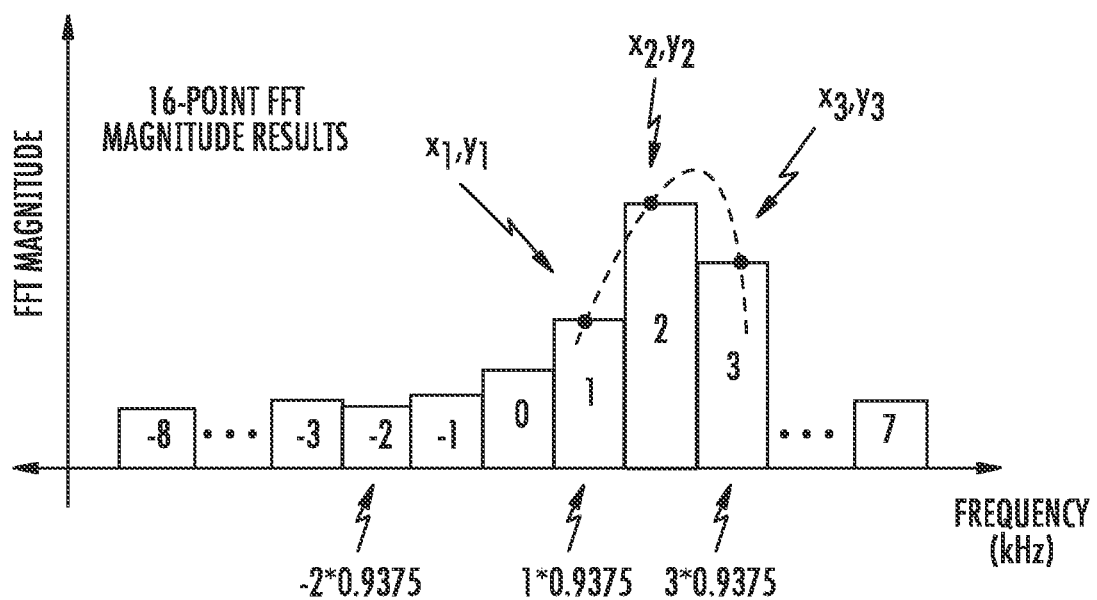
FIG. 8 is a graph of frequency bins illustrating an approach for determining peak frequencies by the path searcher of FIG. 1.

An interpolation between the three relevant FFT bins (i.e., the peak bin (bin 2 in FIG. 8) and the adjacent neighbor bins on either side of the peak bin (bins 1 and 3 in FIG. 8)) can further refine the frequency estimate. That is, these operations are used to provide sub-bin frequency resolution. As will be appreciated by those skilled in the art, a second order equation, such as a quadratic or parabolic equation, may be used to connect three arbitrary points. In the present example, the three points to be connected are the center points of the frequency bins 1-3 in FIG. 8, as shown. The maximum (i.e., peak) frequency estimate occurs when the derivative of the quadratic/parabolic function equals 0.

Therefore, given the three frequency bin center points, which are provided by the FFT results, a second order function may be used to determine the values of b, c, and $x_{max}$ (i.e., the peak location). The x,y dataset can be used to set up a system of three equations with three unknowns:

$$y_1 = a + bx_1 + cx_1^2$$

$$y_2 = a + bx_2 + cx_2^2$$

$$y_3 = a + bx_3 + cx_3^2$$

which may be reformatted in into matrices as follows:

$$\begin{bmatrix} 1 & x_1 & x_1^2 \\ 1 & x_2 & x_2^2 \\ 1 & x_3 & x_3^2 \end{bmatrix} \begin{bmatrix} a \\ b \\ c \end{bmatrix} = \begin{bmatrix} y_1 \\ y_2 \\ y_3 \end{bmatrix} \Leftrightarrow \begin{bmatrix} 1 & x_1 & x_1^2 & y_1 \\ 1 & x_2 & x_2^2 & y_2 \\ 1 & x_3 & x_3^2 & y_3 \end{bmatrix}$$

The matrices may then be simplified by Gauss-Jordan Elimination as follows:

$$\begin{bmatrix} 1 & x_1 & x_1^2 & y_1 \\ 0 & 1 & (x_2 + x_1) & (y_2 - y_1)/\Delta x \\ 0 & 0 & 1 & (y_3 - 2y_2 + y_1)/2\Delta x^2 \end{bmatrix}$$

Now solve for c, then back-substitute to find b:

$$c = \frac{(y_3 - 2y_2 + y_1)}{2\Delta x^2}$$

$$b = \frac{(y_2 - y_1)}{\Delta x} - \frac{(y_3 - 2y_2 + y_1) \cdot (x_2 + x_1)}{2\Delta x^2}$$

Finally, solve for $x_{max}$:

$$x_{max} = \frac{(x_2 + x_1) \cdot (y_3 - 2y_2 + y_1) - (y_2 - y_1) \cdot 2 \cdot \Delta x}{2 \cdot (y_3 - 2y_2 + y_1)}$$

The forgoing operations result in approximately seven add operations, two multiplies, four shifts, and one division operation, which provides for relatively easy implementation in terms of computational complexity, as will be appreciated by those skilled in the art. Yet, this peak frequency refinement provides significant advantages in terms of rake finger performance, as it provides a more accurate starting point for pilot/frequency acquisition which results in quicker locks, as will be appreciated by the skilled artisan.

Figure 9:
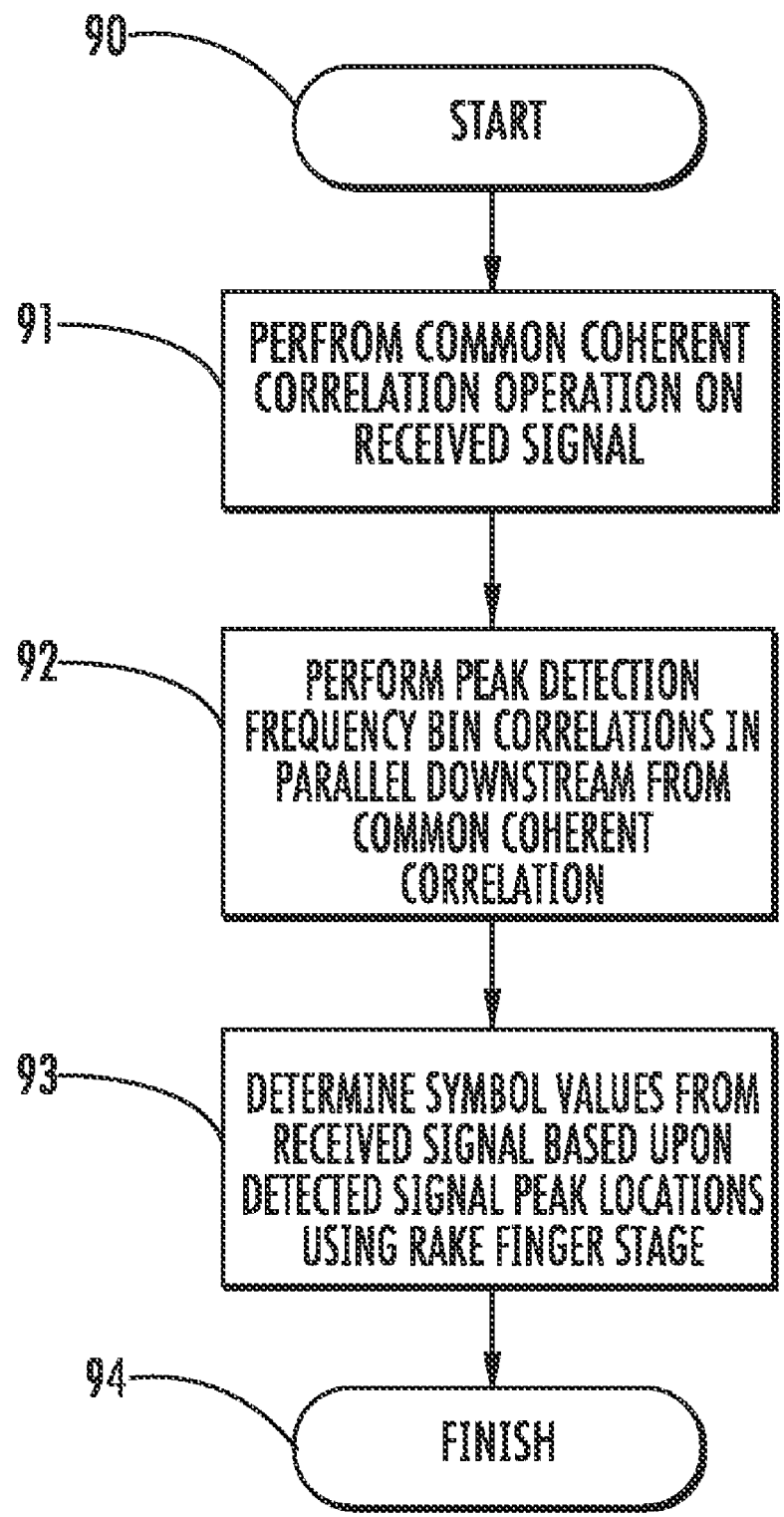
FIG. 9 is a flow diagram and illustrating operational method aspects implemented by the path searcher of FIG. 2.

A related wireless communications method aspect is now described with reference to FIG. 9. Beginning at Block 90, the method illustratively includes detecting signal peak locations in a received signal by performing a common coherent correlation operation on the received signal, at Block 91, as discussed further above. The method further illustratively includes performing a plurality of peak detection frequency bin correlations in parallel and downstream from the common coherent correlation, at Block 92, and determining symbol values from the received signal based upon the detected signal peak locations using a RAKE finger stage, at Block 93, thus concluding the illustrated method (Block 94).

The above-described path searcher 31 advantageously utilizes a "short" common coherent correlation up front (i.e., upstream) that is shared over all frequency bins. Moreover, by "tuning" the length of the short correlator desired overall structure correlation gain vs. computational complexity may be realized. Furthermore, utilizing FFTs as the primary computational vehicle for frequency binning provides still further computation complexity reduction. More particularly, judicious choice of FFT size may significantly reduce complexity, such as decomposing a 16-point FFT into a staged signal flow graph using 4-point FFT engines and additional multiplication factors. It should also be noted that in some embodiments the FFT may be replaced with a Chirp Transform Algorithm (CTA) approach to provide still further frequency binning flexibility, i.e., to narrow the particular frequency range of interest, as will be appreciated by those skilled in the art.

In some embodiments a split radix FFT may be used for other numbers of frequency bins besides the exemplary sixteen discussed above. As noted above, the path searcher 31 advantageously provides an efficient estimation of frequency offset to seed the RAKE finger PLLs, as will be discussed further below, which provides enhanced performance. It will also be appreciated that the path searcher 31 further provides the ability to combine multiple FFT (or CTA) results coherently or non-coherently based on channel coherence time.

Another significant advantage of the path searcher 31 is that the common coherent correlator 40 operates at a signal rate (e.g., the chip rate in the case of W-CDMA system), but because it steps down the chip rate (by 256 in the example illustrated in FIG. 2), the peak detection frequency bin correlators 46a-46p advantageously operate at a rate lower than the chip rate (i.e., at the control symbol rate). This may provide advantages such as allowing the second stage peak detection frequency bin correlators 46a-46p to be implemented in software (i.e., with a microprocessor) as opposed to the front-end RF hardware (e.g., FPGA, etc.).

While the RAKE receiver 30 may also be used is typical wireless applications where normal to moderate multipath fading is experienced, it is particularly well suited for relatively high velocity applications where Doppler spreading is more severe. By way of example, potential uses include airborne applications (e.g., ground-to-air communications, etc.), high-speed bullet trains, etc., although it may be used in other applications as well.

Referring now additionally to FIGS. 10-14, additional details of the rake finger stage 32 are now provided. By way of background, W-CDMA product platforms may operate in high velocity (and hence high Doppler frequency offset) scenarios, as noted above. Yet, high performance is still desired in such applications. As a result, some form of frequency tracking in the RAKE fingers is typically required. Traditional phase locked loop (PLL) designs perform the phase correction at the chip rate. However, this may limit functional partitioning (i.e. prevent implementation of at least portions of the RAKE receiver in software), and it may also lead to a high computational complexity.

In this regard, the RAKE finger stage 32 illustratively includes a plurality of RAKE fingers 33 for determining symbol values from a received signal, which in the present example is a spread-spectrum CDMA 8x rate complex digital baseband signal, although other input signals and rates are possible in different embodiments. Each RAKE finger illustratively includes a sample buffer 100 for storing samples received from receiver front-end circuitry 101. Again, other buffering arrangements (or no buffer) may be used in some embodiments. Time-staggered versions of the received signal samples (i.e., early, on-time (OT), and late) are selectively switched to the input of a "conceptual" multiplier 102, which has as its other input the scrambling coefficients $C_{scramble}(k_s)$.

First and second de-spreaders 104, 105 are coupled to the output of the multiplier 102. The first de-spreader 104 is a data portion which, in the illustrated embodiment, is used for the on-time stream only. The second de-spreader 105 is the control portion, which is used with the early, on-time, and late signal streams. The first de-spreader 104 illustratively includes a multiplier 106 coupled to the output $z(u_k,k)$ from the multiplier 102, as well as data coefficients $C_{d,OVSF}(k)$. The output of the multiplier 106 is provided to an accumulator comprising an adder 105 and delay element 108. The delay element 108 further has as an input a reset data signal that is synchronized to a data timing signal. An output $S_d(n_d)$ of the delay element 108 provides the output for the first de-spreader 104 to a phase-locked loop (PLL) for frequency tracking, which will be discussed further below.

The components of the second de-spreader 105 are similar to those of the first de-spreader 104 and include a multiplier 116, and an accumulator comprising an adder 117 and a delay element 118. The difference between the first and second de-spreaders 104, 105 is that the multiplier 116 receives as its second input control coefficients $C_{c,OVSF}(k)$, and the delay element 118 has a control reset that is synchronized to a control symbol timing. An output $S_c(n_c)$ of the delay element 118 is also provided to the symbol rate PLL section, as well as to a timing control unit (TCU) 120. The TCU provides timing and control signals $u_k$ and skip/repeat ctrl to the sample buffer 100.

The de-spreaders 104, 105 operate at the chip rate of the received spread-spectrum signal. However, in the illustrated embodiment the symbol rate PLL section advantageously operates at the control symbol rate, which is lower than the chip rate (256× lower). That is, the rate is reduced by the delay elements 108, 118 (e.g., by 256 chips), just as in the path searcher 31 described above. In this regard, the de-spreaders also provide a correlation and decimation of the signal before subsequent signal processing by the symbol rate PLL section.

The symbol rate PLL section illustratively includes first and second multipliers 122, 123 (FIG. 12) each respectively coupled to outputs $S_c(n_c)$ and $S_d(n_d)$ from the first and second de-spreaders 104, 105, and a PLL update block 121. The first and second multipliers 122, 123 provide respective outputs $S'_c(n_c)$ and $S'_d(n_d)$, the former of which is provided as an input to the PLL update block 121, as well as to the remaining downstream control signal processing (discussed further below with reference to FIG. 16), and the later is also provided to the downstream signal processing. The PLL update block 121 also provides frequency feedback components to the first and second multipliers 122, 123, respectively.

Figure 13:
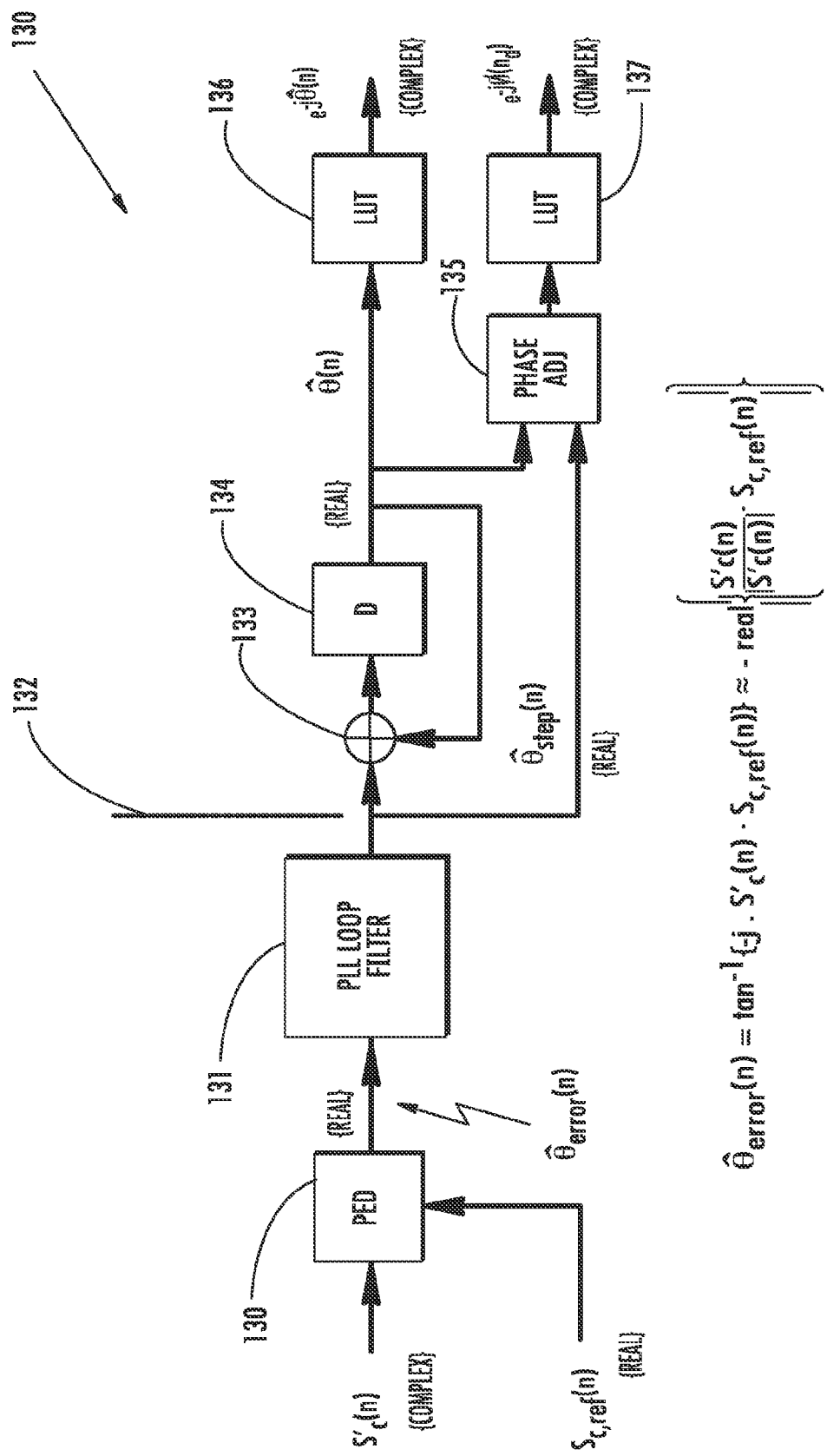
FIG. 13 is a block diagram illustrating the PLL update blocks of FIG. 10 in greater detail.

The PLL update block 121 is now further described with reference to FIG. 13. A phase error detector (PED) receives the output $S'_c(n_c)$, along with a reference signal $S_{c,ref}(n)$. The detected error of the PED 130 is input to a PLL loop filter 131 as shown. An exemplary formula representing the detected error is provided at the bottom of FIG. 13 for reference. However, other approaches may be used for approximating an arctangent function, as will be appreciated by those skilled in the art. These first two components (i.e., those to the left of the dotted line 132) run on control channel pilot symbols of the uplink slot, and run updates for each DPCCH pilot symbol, as will be appreciated by those skilled in the art. The right hand portion of the PLL update block 121 (i.e., to the right of the line 132) runs continuously at the control channel (data channel) symbol rate. More specifically, once computed for the control channel, the phase correction term is adjusted on the data channel to compensate for potentially different symbol rates.

With respect to uplink DPCCH frequency tracking using the symbol rate-based PLL, the PLL may drive the phase correction for the 256 chip control channel symbol with the zero-phase reference mid-symbol. Moreover, the data channel may be at a higher rate, and therefore minor adjustments may be applied to the data channel correction term to provide enhanced performance as follows:

$$\phi(n_d) = \hat{\theta}(n) + \left(\frac{1-L}{2 \cdot L} + \frac{l}{L}\right) \cdot \hat{\theta}_{step}(n)$$

$$= \hat{\theta}(n) + \left(\frac{1-L+2 \cdot l}{2 \cdot L}\right) \cdot \hat{\theta}_{step}(n),$$

for $l = 0 \ldots L-1$ $$L = \frac{SF_{control}}{SF_{data}}$$

$$= \frac{256}{SF_{data}},$$

where $SF_{data} = 4, 8, 16, 32, 64, 128, 256$

Figure 12:
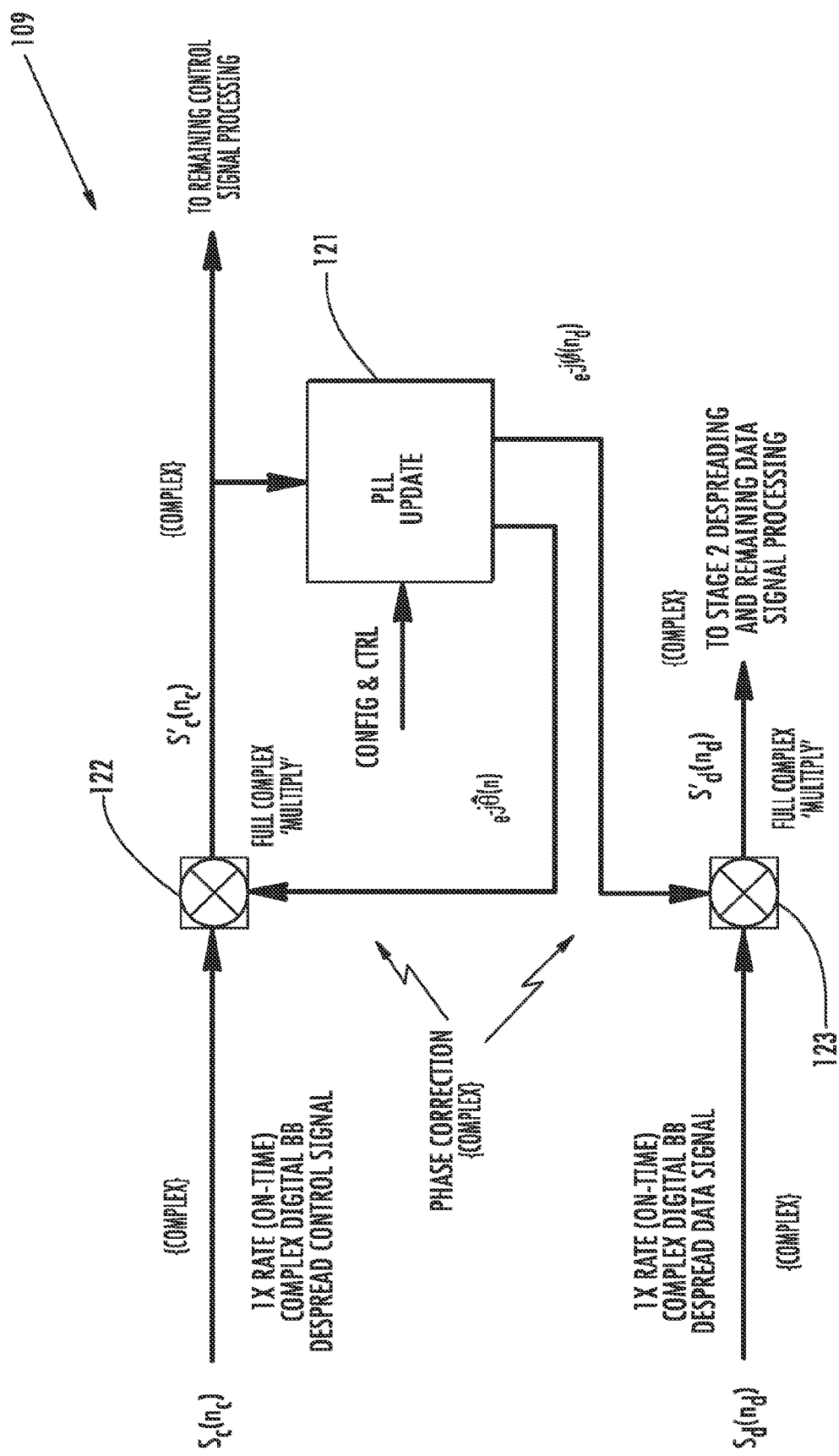
FIG. 12 is a block diagram of the phase locked loop section of the RAKE finger of FIG. 10 in greater detail.

The right hand portion includes an adder 133 coupled to the output of the PLL loop filter 131, and an accumulator comprising a delay element 134 coupled to the output of an adder 133. The delay element 134 also provides a feedback input to the adder 133. A sin/cos look-up table (LUT) is downstream from the delay element 134 and provides the frequency feedback component to the multiplier 122 (see FIG. 12). Furthermore, a phase adjustor 135 has as its inputs the output of the PLL loop filter 131, and the output of the delay element 134. The phase adjustor 135 advantageously compensates symbol rate differences between control channel and data channel symbols, as will be appreciated by the skilled artisan. A LUT 137 receives the output of the phase adjustor 135 and provides the frequency feedback component for the multiplier 123 (FIG. 12).

Figure 14:
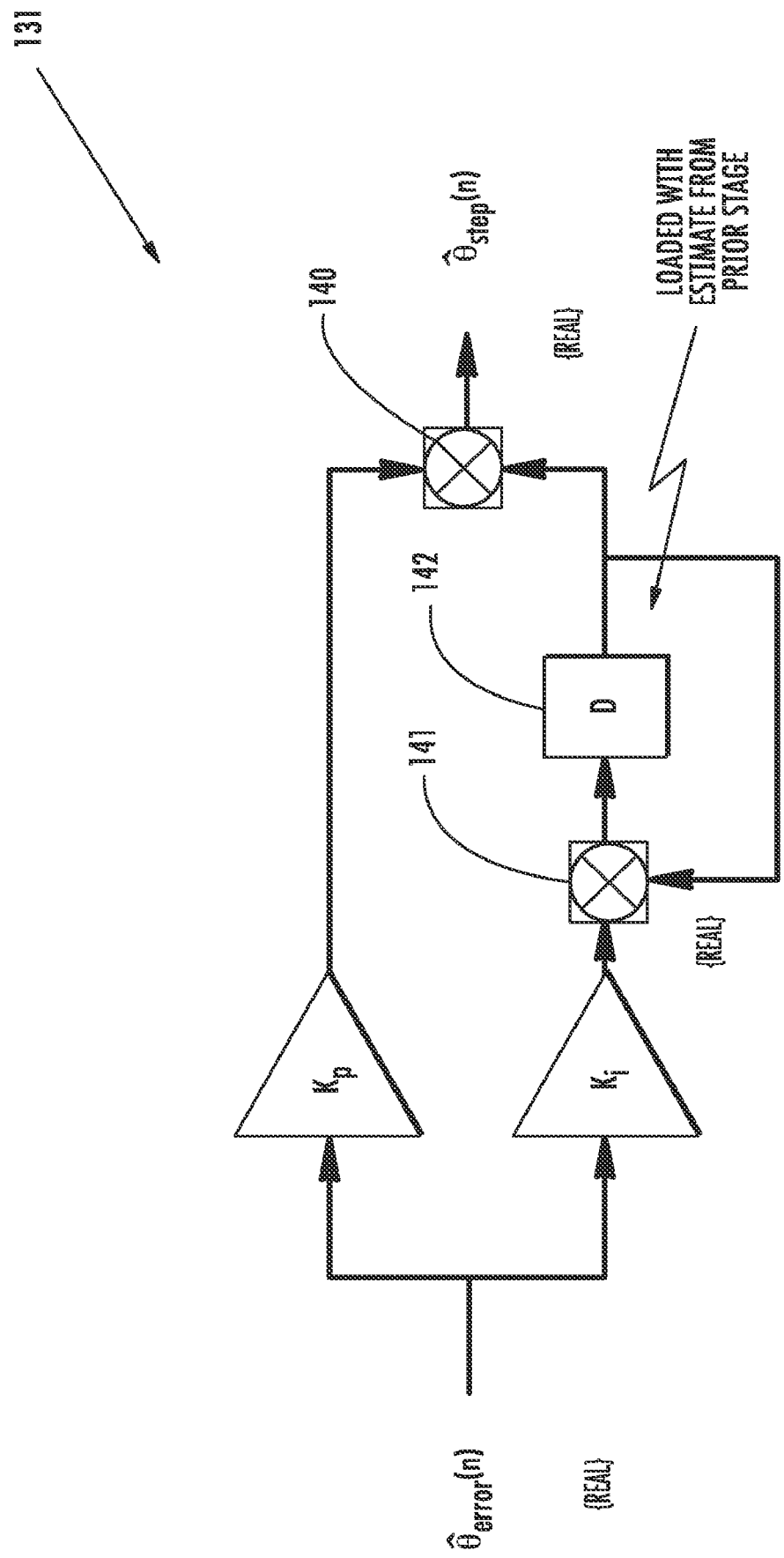
FIG. 14 is a block diagram of the PLL loop filter of FIG. 13 in greater detail.

Referring additionally to FIG. 14, the PLL loop filter 131 is now described in greater detail. Input buffers $K_p$, $K_i$ receive the error signal from the PED 30, and the output of the input buffer $K_p$ is provided to an adder 140. The output of the buffer $K_i$ is coupled to an accumulator comprising an adder 141 and a delay element 142 downstream from the adder. The delay element 142 also provides a feedback input to the adder 141. The output of the delay element 142 provides the second input to the adder 140, which provides the output of the PLL loop filter 131.

It should also be noted that in the above-described PLL loop filter, the overall loop a second order loop, as will be appreciated by those skilled in the art. Moreover, the loop can track phase and frequency offsets with substantially zero steady state error. Also, the step accumulator is loaded with the searcher estimate of the frequency offset. That is, the delay element 142 is seeded by the estimate of the signal peak value from the path searcher 31 via the RFM 34.

Because the symbol rate PLL stage advantageously operates at the lower symbol rate, this portion of the circuitry may advantageously be implemented with a processor/software, leaving only the upstream components to be implemented with hardware (e.g., FPGA, etc.), to therefore provide improved functional partitioning in some embodiments. Further, because the PLL phase correction is applied to the much lower descrambled and de-spread symbol rates, this result is a significant complexity reduction. At finger startup, the PLL update block 121 may advantageously be initialized to the frequency offset estimate to provide still further performance enhancements.

Furthermore, a relatively simplified phase error detector may be utilized as shown, which may avoid the need for Coordinate Rotation Digital Computers (CORDICs) or large arctangent look-up-tables, to provide still further complexity reduction. Additionally, a relatively straightforward phase adjustment scheme may be used to optimize the phase correction on the data path, again providing performance enhancement. Moreover, the channel estimation and correction follow the PLL, coupled with PLL initialization, which enables more reliable data detection during PLL acquisition and again may contribute to enhanced performance.

Figure 15:
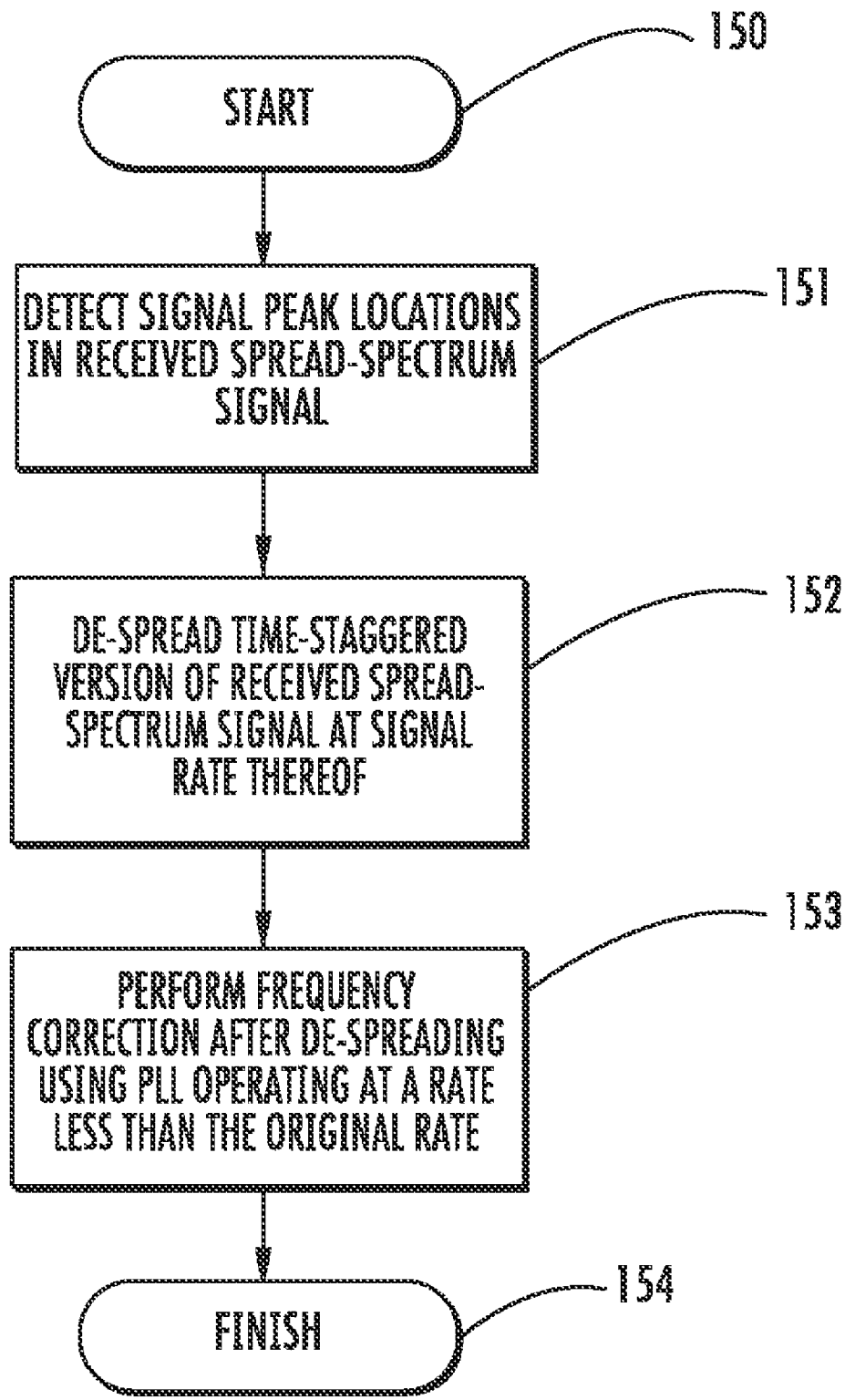
FIG. 15 is a flow diagram illustrating operational method aspects implemented by the RAKE finger stage of FIG. 2.

A related wireless communications method aspect is now described with reference to FIG. 15. Beginning at Block 150, the method illustratively includes detecting signal peak locations in a received spread-spectrum signal, at Block 151, and determining symbol values from the received spread-spectrum signal based upon the detected signal peak locations using a plurality of RAKE fingers. More particularly, the symbol values may be determined by de-spreading time-staggered versions of the received spread-spectrum signal at a signal rate of the received spread-spectrum signal, at Block 152, and performing frequency correction after de-spreading using a phase lock loop (PLL) operating at a rate that is less than the signal rate, at Block 153, thus concluding the illustrated method (Block 154).

Figure 16:
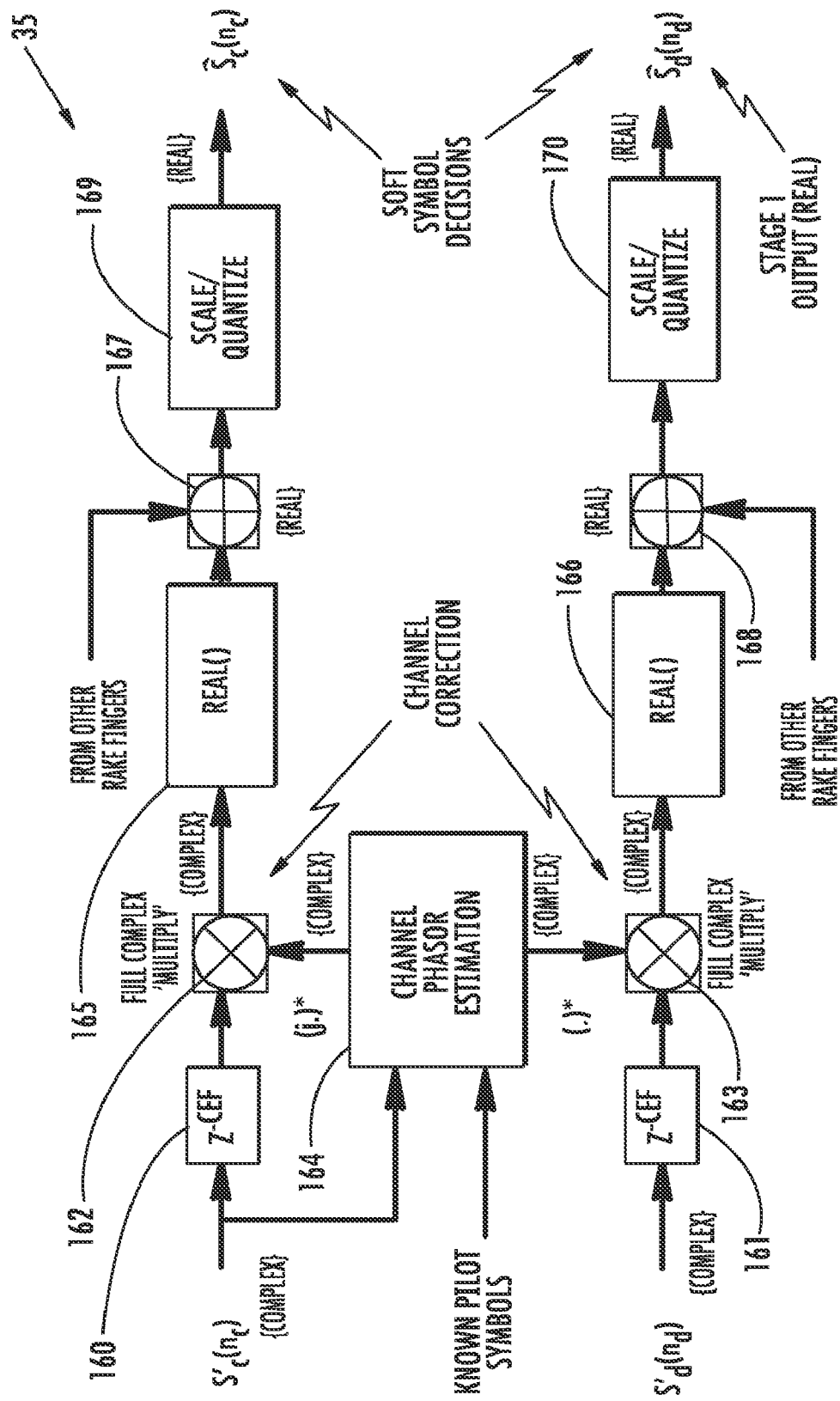
FIG. 16 is a schematic block diagram of the maximum ratio combining/soft decision mapping output stage of the wireless communication device of FIG. 1 in greater detail.

Turning now additionally to FIG. 16, the output stage 35 illustratively includes respective input stages 160, 161 for each of the symbol rate PLL section outputs $S'_d(n_d)$ and $S'_c(n_c)$. Downstream from each of the inputs stages 160, 161 is a respective multiplier 162, 163, which also has as a second input respective outputs of a channel phasor estimator 164. The channel phasor estimator has as its input the output $S'_c(n_c)$ and a known pilot symbol reference. By way of example, the channel phase estimator 164 may include a 4-tap channel estimator filter, such as a weighted multislot averaging channel estimator filter (WMSA CEF), although other configurations are also possible. The multiplier 162 is followed by a real operator block 165, an adder 167 combining the output of the real operator block with an input from other RAKE fingers, and a scale/quantize block 169 coupled to the output of the combiner for soft-decision mapping. Similarly, the multiplier 163 is followed by a real operator block 166, an adder 168 combining the output of the real operator block with an input from other RAKE fingers, and a scale/quantize block 170 coupled to the output of the combiner also for soft decision mapping. It should be noted that the soft decision mapping could be performed before the maximum ratio combining in some embodiments.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
    a path searcher for detecting signal peak locations in a received spread-spectrum signal; and
    a RAKE finger stage comprising a plurality of RAKE fingers for determining symbol values from the received spread-spectrum signal based upon the detected signal peak locations, each RAKE finger comprising
        at least one de-spreader for de-spreading time-staggered versions of the received spread-spectrum signal and operating at a signal rate of the received spread-spectrum signal, and
        a frequency corrector downstream from said at least one de-spreader comprising a phase lock loop (PLL) operating at a rate that is less than the signal rate.

2. The wireless communications device of claim 1 wherein said at least one de-spreader comprises a control channel de-spreader for the time-staggered signal versions, and a data channel de-spreader for on-time signal versions.

3. The wireless communications device of claim 1 wherein said at least one de-spreader is implemented using discrete circuitry, and wherein said frequency corrector is implemented using a microprocessor.

4. The wireless communications device of claim 1 wherein each RAKE finger comprises a control output path for outputting control channel symbols, and a data output path for outputting data channel symbols.

5. The wireless communications device of claim 4 wherein said data output path comprises a phase adjust module coupled to said control output path for compensating symbol rate phase differences between control and data symbols.

6. The wireless communications device of claim 1 wherein each RAKE finger further comprises a buffer upstream from said at-least one de-spreader for buffering the time-staggered versions of the received spread-spectrum signal.

7. The wireless communications device of claim 1 wherein the received spread-spectrum signal comprises a Code Division Multiple Access (CDMA) signal.

8. The wireless communications device of claim 1 further comprising a finger controller for controlling said RAKE finger stage based upon the detected signal peak locations.

9. The wireless communications device of claim 1 further comprising an output stage downstream from said RAKE finger stage for outputting combined symbols based upon the detected symbol values.

10. A wireless communications device comprising:
   a path searcher for detecting peak values in a received spread-spectrum Code Division Multiple Access (CDMA) signal; and
   a RAKE finger stage comprising a plurality of RAKE fingers for determining symbol values from the received spread-spectrum CDMA signal based upon the detected signal peak locations, each RAKE finger comprising
      at least one de-spreader for de-spreading time-staggered versions of the received spread-spectrum COMA signal and operating at a signal rate of the received spread-spectrum CDMA signal, and
      a frequency corrector downstream from said at least one de-spreader comprising a phase lock loop (PLL) operating at a rate that is less than the signal rate,
      said at least one de-spreader being implemented using discrete circuitry, and said frequency corrector being implemented using a microprocessor.

11. The wireless communications device of claim 10 wherein said at least one de-spreader comprises a control channel de-spreader for the time-staggered signal versions, and a data channel de-spreader for on-time signal versions.

12. The wireless communications device of claim 10 wherein each RAKE finger comprises a control channel output path for outputting control symbols, and a data channel output path for outputting data symbols.

13. The wireless communications device of claim 12 wherein said data output path comprises a phase adjust module coupled to said control output path for compensating symbol rate phase differences between control and data symbols.

14. The wireless communications device of claim 10 wherein each RAKE finger further comprises a buffer upstream from said at least one de-spreader for buffering the time-staggered versions of the received spread-spectrum CDMA signal.

15. The wireless communications device of claim 10 further comprising a finger controller for controlling said RAKE finger stage based upon the detected signal peak locations.

16. The wireless communications device of claim 10 further comprising an output stage downstream from said RAKE finger stage for outputting combined symbols based upon the detected symbol values.

17. A wireless communications method comprising:
   detecting signal peak locations in a received spread-spectrum signal; and
   determining symbol values from the received spread-spectrum signal based upon the detected signal peak locations using a plurality of RAKE fingers by
      de-spreading time-staggered versions of the received spread-spectrum signal at a signal rate of the received spread-spectrum signal, and
      performing frequency correction after de-spreading using a phase lock loop (PLL) operating at a rate that is less than the signal rate.

18. The method of claim 17 wherein de-spreading comprises de-spreading the time-staggered signal versions using a control channel de-spreader, and channel de-spreading on-time signal versions using a data de-spreader.

19. The method of claim 17 wherein de-spreading comprises de-spreading using discrete circuitry, and wherein performing frequency correction comprises performing frequency correction using a microprocessor.

20. The method of claim 17 wherein each RAKE finger comprises a control channel output path for outputting control symbols, and a data channel output path for outputting data symbols.

21. The method of claim 20 wherein the data channel output path comprises a phase adjust module coupled to the control output path for compensating symbol phase differences between control and data symbols.

22. The method of claim 17 further comprising buffering the time-staggered versions of the received spread-spectrum signal prior to de-spreading.

23. The method of claim 17 wherein the received spread-spectrum signal comprises a Code Division Multiple Access (CDMA) signal.

* * * * *